(12) United States Patent
Hussaini

(10) Patent No.: US 11,024,277 B2
(45) Date of Patent: Jun. 1, 2021

(54) SPRAY APPLIED SOUND BARRIER COMPOSITIONS OVER ABSORPTION MATERIALS

(71) Applicant: BASF SE, Ludwigshafen (DE)

(72) Inventor: Akbar Hussaini, Rochester Hills, MI (US)

(73) Assignee: BASF SE

( * ) Notice: Subject to any disclaimer, the term of this patent is extended or adjusted under 35 U.S.C. 154(b) by 513 days.

(21) Appl. No.: 15/766,524

(22) PCT Filed: Oct. 7, 2016

(86) PCT No.: PCT/US2016/056142
§ 371 (c)(1),
(2) Date: Apr. 6, 2018

(87) PCT Pub. No.: WO2017/062878
PCT Pub. Date: Apr. 13, 2017

(65) Prior Publication Data
US 2019/0385582 A1    Dec. 19, 2019

Related U.S. Application Data

(60) Provisional application No. 62/239,494, filed on Oct. 9, 2015.

(51) Int. Cl.
*G10K 11/162* (2006.01)
*C09D 7/61* (2018.01)
(Continued)

(52) U.S. Cl.
CPC .............. *G10K 11/162* (2013.01); *C09D 5/00* (2013.01); *C09D 7/61* (2018.01); *C09D 133/062* (2013.01); *C09D 133/08* (2013.01); *E04B 1/86* (2013.01)

(58) Field of Classification Search
CPC .......... G10K 11/162; C09D 7/61; C09D 5/00; C09D 133/08; C09D 133/062; E04B 1/86
(Continued)

(56) References Cited

U.S. PATENT DOCUMENTS

| 2,980,575 | A | * | 4/1961 | Petry | ................. | B29C 67/20 |
| | | | | | | 442/323 |
| 5,230,940 | A | * | 7/1993 | Bohm | ................. | C08J 9/30 |
| | | | | | | 428/308.4 |

(Continued)

FOREIGN PATENT DOCUMENTS

EP    2 077 303 B1    8/2009

OTHER PUBLICATIONS

International Search Report and Written Opinion in International Application No. PCT/US2016/056142 dated Jan. 20, 2017 (12 pages).
(Continued)

*Primary Examiner* — Forrest M Phillips
(74) *Attorney, Agent, or Firm* — Faegre Drinker Biddle & Reath LLP

(57) ABSTRACT

An acoustic barrier includes a sound absorption material; a coating of a cured aqueous composition, the aqueous composition including an aqueous dispersion of a co-polymer comprising of monomers of two or more of an acrylate, a cyano-substituted acrylate, or styrenic; and an acrylic dispersion.

20 Claims, 1 Drawing Sheet

(51) Int. Cl.
*C09D 5/00* (2006.01)
*C09D 133/06* (2006.01)
*C09D 133/08* (2006.01)
*E04B 1/86* (2006.01)

(58) Field of Classification Search
USPC .......................................................... 181/294
See application file for complete search history.

(56) References Cited

U.S. PATENT DOCUMENTS

| | | |
|---|---|---|
| 7,253,218 B2 | 8/2007 | Hussaini et al. |
| 7,893,149 B2 | 2/2011 | Hermes et al. |
| 9,033,101 B2 * | 5/2015 | Coates .................... D04H 1/54 |
| | | 181/284 |
| 2004/0115363 A1 | 6/2004 | Desai et al. |
| 2004/0211934 A1 | 10/2004 | Lestarge |
| 2005/0189442 A1 | 9/2005 | Hussaini et al. |
| 2007/0252303 A1 | 11/2007 | Loen et al. |
| 2009/0000865 A1 | 1/2009 | Zisch et al. |
| 2009/0121174 A1 | 5/2009 | Johnson et al. |
| 2014/0233781 A1* | 8/2014 | Kawakami ........... D04H 1/4234 |
| | | 381/359 |
| 2015/0097136 A1 | 4/2015 | Wulff et al. |

OTHER PUBLICATIONS

Extended European Search Report in EP Application No. 16854498.9, dated May 21, 2019 (9 pages).

* cited by examiner

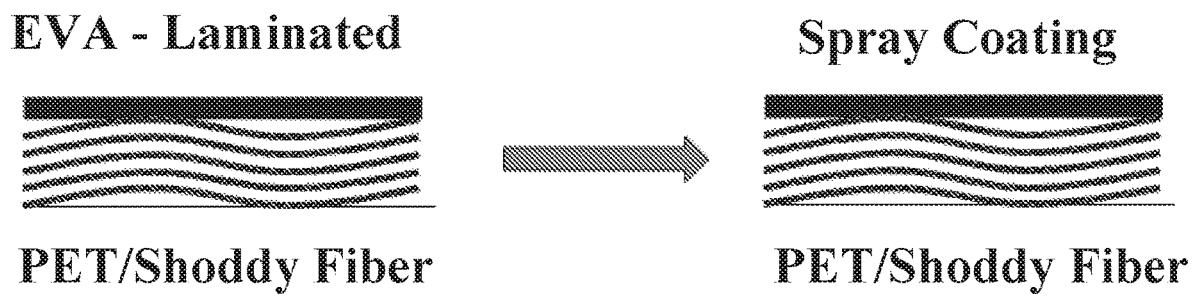

SPRAY APPLIED SOUND BARRIER COMPOSITIONS OVER ABSORPTION MATERIALS

CROSS-REFERENCE TO RELATED APPLICATIONS

This application is a U.S. National Phase Application under 35 U.S.C. § 371 of International Application No. PCT/US2016/056142, filed on Oct. 7, 2016, which claims the benefit of U.S. Provisional Patent Application No. 62/239,494, filed on Oct. 9, 2015, the entire disclosures of which are incorporated herein by reference for any and all purposes.

FIELD

The present technology is generally related to spray-applied water-based coatings to be used on acoustic barrier components, methods of their preparation, and their use in downstream applications.

BACKGROUND

Decreasing noise associated with vibration in industrial machines, vehicles, and appliances is an important goal in various industries. Currently, acoustic barrier materials are formed with a laminated ethyl vinyl acetate (EVA) barrier over sound absorption materials. There is also an adhesive layer between the EVA laminate and the sound absorption material.

For vehicles, some common types of sound absorption materials include cast foam, slab foam, and/or a fiber. The cast foam can be a polyurethane foam, an open or closed cell, and can be formed to the contour of the dashboard of a vehicle. The slab foam can be a polyurethane foam, and an open or closed cell, but cannot be formed to the contour of the dashboard. The fiber can be a cotton or synthetic fiber (e.g., a felt or polyester) and cannot be formed to the contour of the dashboard.

A major limitation of EVA laminate is that it cannot be applied consistently at lower mass levels.

SUMMARY

In one aspect, an aqueous composition is provided, which includes an aqueous dispersion of a co-polymer containing at least two monomers selected from an acrylate, a cyano-substituted acrylate, and a styrene; and an acrylic dispersion including water and an acrylic polymer including n-butyl acrylate. The aqueous dispersion can contain about 39.89% of water, 39.16% of n-butyl acrylate, 7.94% of styrene, and 7.94% of acrylonitrile. The acrylic dispersion can contain about 37.88 wt % of water, 3.42 wt % of 2-ethylhexyl acrylate, 2.83 wt % of methyl methacrylate, and 49.42 wt % of n-butyl acrylate. The aqueous composition may also include a filler; a defoaming agent; a rheological modifier; and/or a biocide.

In another aspect, an acoustic barrier is provided, the barrier including a sound absorption material at least partially coated with any of the aqueous compositions described herein. The aqueous composition may be spray-coated onto the sound damping material.

In yet another aspect, a method of preparing an acoustic barrier is provided. The method includes applying the aqueous composition described above to a surface of a fiber material, foam material, or other sound absorption material.

BRIEF DESCRIPTION OF THE DRAWINGS

FIG. 1 provides a schematic of an acoustic barrier made with EVA laminate and an acoustic barrier made with the aqueous composition provided herein.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, the term "substituted," unless specifically defined differently, refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like. For some groups, substituted may provide for attachment of an alkyl group to another defined group, such as a cycloalkyl group._

As used herein, the term (meth)acrylic or (meth)acrylate refers to acrylic or methacrylic acid, esters of acrylic or methacrylic acid, and salts, amides, and other suitable derivatives of acrylic or methacrylic acid, and mixtures thereof. Illustrative examples of suitable (meth)acrylic monomers include, without limitation, the following methacrylate esters: methyl methacrylate, ethyl methacrylate, n-propyl methacrylate, n-butyl methacrylate (BMA), isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate (GMA), benzyl methacrylate, allyl methacrylate, 2-n-butoxyethyl methacrylate, 2-chloroethyl methacrylate, sec-butyl-methacrylate, tert-butyl methacrylate, 2-ethylbutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate. Example of suitable acrylate esters include, without limitation, methyl acrylate, ethyl acrylate, n-propyl acrylate, isopropyl acrylate, n-butyl acrylate (BA), n-decyl acrylate, isobutyl acrylate, n-amyl acrylate, n-hexyl acrylate, isoamyl acrylate, 2-hydroxyethyl acrylate, 2-hydroxypropyl acrylate, N,N-dimethylaminoethyl acrylate, N,N-diethylaminoethyl acrylate, t-butylaminoethyl acrylate, 2-sulfoethyl acrylate, trifluoroethyl acrylate, glycidyl acrylate, benzyl acrylate, allyl acrylate, 2-n-butoxyethyl acrylate, 2-chloroethyl acrylate, sec-butyl-acrylate, tert-butyl acrylate, 2-ethylbutyl acrylate, cinnamyl acrylate, crotyl acrylate, cyclohexyl acrylate, cyclopentyl acrylate, 2-ethoxyethyl acrylate, furfuryl acrylate, hexafluoroisopropyl acrylate, methallyl acrylate, 3-methoxybutyl acrylate, 2-methoxybutyl acrylate, 2-nitro-2-methylpropyl acrylate, n-octylacrylate, 2-ethylhexyl acrylate, 2-phenoxyethyl acrylate, 2-phenylethyl acrylate, phenyl acrylate, propargyl acrylate, tetrahydrofurfuryl acrylate and tetrahydropyranyl acrylate.

As used herein, the term "acrylic-containing group" or "methacrylate-containing group" refers to a compound that has a polymerizable acrylate or methacrylate group.

Provided herein are aqueous compositions that can be used to replace EVA laminates in acoustic barrier materials. As used herein "acoustic barrier materials" refer to materials that reduce or abate sound transmission to varying degrees. The aqueous compositions may be applied to sound absorption material as a backing to the material to provide additional sound dampening, to protect what may be fragile surface of the acoustic barrier materials, and to reduce the mass typically associated with EVA laminates. For example, while EVA laminates are typically adhered to an underlying sound absorption material at about 850 to about 2500 g/m², it has been found that the aqueous composition can be applied at mass levels as low as 100 g/m² on up, thereby resulting in a significant overall weight savings. Where the EVA portion of EVA-laminated sound barriers may weight 2 lbs. or more when used on a dash mat behind a dashboard for a motor vehicle, the aqueous compositions described herein can weigh significantly less. Furthermore, by spraying the aqueous compositions onto the sound absorption materials, variable deposition levels may be achieved resulting in some regions of the sound absorption material having a more substantial layer of the aqueous composition applied than other regions. This allows for fine adjustment of the amount of the backing (i.e. the cured aqueous composition) depending on the exact location on the finished acoustic barrier.

Other advantages that are imparted to the finished acoustic barrier by the aqueous composition include, but are not limited to, optimization of barrier properties over the sound absorbing material, good flexibility, ease of application, elimination or reducing the amount of die cutting of the former laminate materials, elimination of the adhesive layer between EVA laminate and sound absorption material, optimization of the mass layer, and localization of mass on higher sound transmission areas. Further advantages include but are not limited to mass reduction/optimization and the provision of adhesive properties for sandwich composites.

In one aspect, the aqueous composition includes an aqueous dispersion of a co-polymer containing monomers of two or more of an acrylate, a cyano-substituted acrylate, or styrenic; and an acrylic dispersion comprising water and an acrylic polymer comprising n-butyl acrylate. The aqueous dispersion can contain about 39.89% of water, 39.16% of n-butyl acrylate, 7.94% of styrene, and 7.94% of acrylonitrile. The acrylic dispersion contains about 37.88 wt % of water, 3.42 wt % of 2-ethylhexyl acrylate, 2.83 wt % of methyl methacrylate, and 49.42 wt % of n-butyl acrylate. The composition may also include other additives such as a filler; a defoaming agent; a rheological modifier; and/or a biocide. The composition can also include pigments for aesthetic purposes. The pigments can be, but are not limited to, black or white pigments.

In one embodiment, the aqueous composition has a glass transition temperature (Tg) from about −40° C. to about 20° C. In another embodiment, the aqueous composition has a glass transition temperature (Tg) of about −15° C. to about 0° C. In yet another embodiment, the aqueous composition has a glass transition temperature (Tg) of about −7° C.

In one embodiment, the aqueous composition has a viscosity of about 25,000 to about 35,000 mPa·s at 25° C. In another embodiment, the aqueous composition has a viscosity of about 3000 to about 40.00 centipoise at 25° C.

The aqueous dispersion of the co-polymer may include 40-60% water, 40-60% of an acrylic polymer, and 0.0-50.0 ppm of a 3:1 mixture of 5-chloro-2-methyl-2H-isothiazol-3-one and 2-methyl-2H-isothiazol-3-one. In one embodiment, the aqueous dispersion can contain about 39.89% of water, 39.16% of n-butyl acrylate, 7.94% of styrene, and 7.94% of acrylonitrile. In one embodiment, the acrylic dispersion may include an acrylic polymer that contains n-butyl acrylate, 30-50% of water, and 0.0-50.0 ppm of a 3:1 mixture of 5-chloro-2-methyl-2H-isothiazol-3-one and 2-methyl-2H-isothiazol-3-one. In one embodiment, the acrylic dispersion may contain about 37.88 wt % of water, 3.42 wt % of 2-ethylhexyl acrylate, 2.83 wt % of methyl methacrylate, and 49.42 wt % of n-butyl acrylate.

The cyano-substituted acrylate may include materials such as, but not limited to, acrylonitrile.

The styrene for use in the co-polymer of the aqueous composition may include styrene or α-methylstyrene.

In one embodiment, the aqueous composition includes from about 45 wt % to about 55 wt % of a filler. Examples of a filler include, but are not limited to, calcium carbonate, barium sulfate, glass filler, magnesium carbonate, plastic microsphere, or mica.

In another embodiment, the defoaming agent includes Foamaster® S (blend of silica and oil, including mineral oil produced by BASF), Rhodoline® DF 540 (produced by Rhodia), Rhodoline® 635 (produced by Solvay), Foamaster® MO 2170 (produced by BASF), or Foamaster® MO 2190 (produced by BASF). The aqueous composition may include as much of a defoaming agent as needed to provide the desired foaming characteristics. This may include less than 1 wt % of the defoaming agent. In other embodiments, the composition includes more than 0 wt % up to about 1 wt % of the defoaming agent.

In a further embodiment, the rheological modifier includes Rheovis® HD 1152 (a hydrophobic modified acrylic swellable copolymer emulsion in water produced by BASF) or Rheovis® AS 1130 (an acrylic copolymer emulsion in water produced by BASF). The aqueous composition may include as much of a rheological modifier as needed to provide the desired solution characteristics. In some embodiments, the composition includes less than 1 wt % of the rheological modifier. In other embodiments, the composition includes more than 0 wt % up to about 1 wt % of the rheological modifier.

In one embodiment, the aqueous composition includes about 10 wt % to about 15 wt % of the aqueous dispersion of the co-polymer.

In one embodiment, the aqueous composition includes about 10 wt % to about 15 wt % of the acrylic dispersion.

In another embodiment, the aqueous composition includes about 20 wt % to about 25 wt % water.

In one embodiment, the aqueous composition includes about 45 wt % to about 55 wt % calcium carbonate, about 20 wt % to about 25 wt % water, about 10 wt % to about 15 wt % of the aqueous dispersion of the co-polymer, about 10 wt % to about 15 wt % of the acrylic dispersion, less than 0.5 wt % of crystalline silica, less than 0.5 wt % of carbon black, and less than 25.0 ppm of a mixture of 5-chloro-2-methyl-2H-isothiazol-3-one and 2-methyl-2H-isothiazol-3-one. In one embodiment, the mixture of 5-chloro-2-methyl-2H-isothiazol-3-one and 2-methyl-2H-isothiazol-3-one is present in the aqueous composition at a ratio of 3:1.

In one embodiment, the aqueous composition comprises about 45 wt % to about 55 wt % calcium carbonate; about 20 wt % to about 25 wt % water; about 10 wt % to about 15 wt % of an aqueous dispersion that includes about 39.89% of water, 39.16% of n-butyl acrylate, 7.94% of styrene, and 7.94% of acrylonitrile; about 10 wt % to about 15 wt % of an acrylic dispersion that includes about 37.88 wt % of water, 3.42 wt % of 2-ethylhexyl acrylate, 2.83 wt % of methyl methacrylate, and 49.42 wt % of n-butyl acrylate; less than about 0.5 wt % crystalline silica; less than about 0.5 wt % carbon black; and less than about 25.0 ppm of a mixture of 5-chloro-2-methyl-2H-isothiazol-3-one and 2-methyl-2H-isothiazol-3-one. In one embodiment, the mixture of 5-chloro-2-methyl-2H-isothiazol-3-one and 2-methyl-2H-isothiazol-3-one is present in the aqueous composition at a ratio of 3:1.

The aqueous composition of the present disclosure can be used in a variety of industries, including automotive, home appliances, building materials, computers, vacuum cleaners, HVAC system, and/or flooring.

As introduced above, the above aqueous compositions are then applied to a sound absorption material, where the water is removed to cure the compositions and form an acoustic barrier. The sound absorption material may include, but are not limited to foams, fibers, wood, and/or mineral. Where the end use of the acoustic barrier is in automotive end uses, the sound absorption material may be a shoddy, foam, polyolefin, or urethane. For example, the acoustic barrier may be a cotton shoddy, synthetic shoddy, polyurethane foam, or polyethylene terephthalate. Where the end use is in construction, the sound absorption material may be a plastic, wood, drywall, or the like.

The acoustic barriers disclosed herein can be used in a variety of industrial machines, vehicles, and appliances. Examples include but are not limited to an automobile or a dishwasher. In one embodiment, the acoustic barrier composite is used for a dashmat of an automobile. In other embodiments, the end use may be an acoustic barrier composite on drywall for housing construction.

In another aspect, a method of preparing an acoustic barrier is provided. The method may include applying the aqueous composition disclosed herein to a surface of a sound absorption material, allowing the water to be removed and curing the composition. The composition can be cured (dried) for about 5 min at 100° C. The sound absorption material with the dried composition can then be cut into the proper shape that permits the sound absorption material to cover the item or object that requires sound treatment.

In one embodiment, the aqueous composition is spray-applied to the sound absorption material such that coating of a desired amount may be achieved. In another embodiment, the aqueous composition is spray-applied at a distance of from about 6 inches to about 30 inches away from the surface of the sound absorption material. The aqueous composition may be spray-applied to the sound absorption material at an even coating level in terms of $g/m^2$ of cured composition. The aqueous composition may be spray-applied to the sound absorption material at an uneven coating level in terms of $g/m^2$ of cured composition to ensure thicker coating in some areas where more sound transmission and/or absorption is needed, as compared to other areas where it may not be as necessary. This may lead to coating of the acoustic barrier material at varying amounts. Such amounts may be from about 100 $g/m^2$ to about 2 $kg/m^2$, depending on the particular region of the acoustic barrier material that is being coated. In other embodiments, the amount is from about 300 $g/m^2$ to about 1000 $g/m^2$, depending on the particular region of the acoustic barrier material that is being coated.

In one embodiment, the aqueous composition is spray-applied to the sound absorption material as described in the process disclosed in U.S. Pat. No. 7,253,218, which is incorporated herein by reference.

The present invention, thus generally described, will be understood more readily by reference to the following examples, which are provided by way of illustration and are not intended to be limiting of the present invention.

EXAMPLES

Example 1. Synthesis of Aqueous Composition 10 grams of Rheovis® HD 1152 (produced by BASF) and 10 grams of deionized water were slowly blended for two minutes and the mixture (the "Rheovis® HD 1152 solution") was placed to the side. In a new container, 672 grams of Acronal® S 504 (produced by BASF) was stirred at 350 rotations per minute to which 1344 grams of Duramite® (calcium carbonate) was then stirred in at initially 350 rotations per minute, which was gradually increased to 1350 rotations per minute in 5 minutes. Aurasperse W 7014 (6.72 grams) was then stirred in followed by 672 grams of Acronal® 4032X (produced by BASF). The mixture was mixed for 5 minutes at 1350 rotations per minute. Finally, 21 grams of the Rheovis® HD 1152 solution was then added followed by 2.632 grams of Foamaster® MO 2190 (produced by BASF). Table 1 below shows the raw ingredients of compositions A, B, and C, each of which was prepared by the process described above.

TABLE 1

| Ingredient | Percentage | Percentage | Percentage |
|---|---|---|---|
| Acronal ® S 504 | 50 | 25 | 0 |
| Acronal ® 4032X | 0 | 25 | 50 |
| Defoamer | <1 | <1 | <1 |
| Calcium Carbonate | 50 | 50 | 50 |
| Rheology Modifier | <1 | <1 | <1 |

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An acoustic barrier comprising:
a sound absorption material;
a coating comprising a cured aqueous composition, the aqueous composition comprising:
an aqueous dispersion of a co-polymer comprising of water and monomers of two or more of an acrylate, a cyano-substituted acrylate, and a styrene; and
an acrylic dispersion comprising water and an acrylic polymer comprising 2-ethylhexyl acrylate, methyl methacrylate, and n-butyl acrylate.

2. The acoustic barrier of claim 1 further comprising at least one of a filler; a defoaming agent; a rheological modifier; or a biocide.

3. The acoustic barrier of claim 2, wherein the filler comprises calcium carbonate, barium sulfate, glass filler, magnesium carbonate, plastic microsphere, or mica; the defoaming agent comprises Foamaster® MO 2170, Rhodoline® DF 540, Rhodoline® 635, or Foamaster MO 2190; and the rheological modifier comprises Rheovis® HD 1152 or Rheovis® AS 1130.

4. The acoustic barrier of claim 1, wherein the coating has a glass transition temperature (Tg) of from about −40° C. to about 20° C.

5. The acoustic barrier of claim 1, wherein the aqueous composition has a viscosity of about 20,000 to about 35,000 mPa·s at 25° C.

6. The acoustic barrier of claim 1, wherein the aqueous composition has a viscosity of about 3000 to about 40,000 centipoise at 25° C.

7. The acoustic barrier of claim 1, wherein the aqueous dispersion of the co-polymer comprises about 39.89% of water, about 39.16% of n-butyl acrylate, about 7.94% of styrene, and about 7.94% of acrylonitrile; and the acrylic dispersion comprises about 37.88 wt % of water, about 3.42 wt % of 2-ethylhexyl acrylate, about 2.83 wt % of methyl methacrylate, and about 49.42 wt % of n-butyl acrylate.

8. The acoustic barrier of claim 1, wherein the composition comprises from about 10 wt % to about 15 wt % of the aqueous dispersion of the co-polymer.

9. The acoustic barrier of claim 1, wherein the composition comprises from about 10 wt % to about 15 wt % of the acrylic dispersion.

10. The acoustic barrier of claim 1, wherein the composition comprises about 45 wt % to about 55 wt % of the filler.

11. The acoustic barrier of claim 1, wherein the composition comprises from about 20 wt % to about 25 wt % of water.

12. The acoustic barrier of claim 1, wherein the composition comprises less than 1% of the defoaming agent.

13. The acoustic barrier of claim 1, wherein the composition comprises less than 1% of the rheological modifier.

14. The acoustic barrier of claim 1, wherein the sound absorption material comprises a foam, a plastic, a natural fiber, wood, concrete, or glass.

15. A method of preparing an acoustic barrier, the method comprising:
applying an aqueous composition to a surface of an acoustic barrier material, the aqueous composition comprising:
an aqueous dispersion of a co-polymer comprising of about 39.89% of water, about 39.16% of n-butyl acrylate, about 7.94% of styrene, and about 7.94% of acrylonitrile;
an acrylic dispersion comprising about 37.88 wt % of water, about 3.42 wt % of 2-ethylhexyl acrylate, about 2.83 wt % of methyl methacrylate, and about 49.42 wt % of n-butyl acrylate.

16. The method of claim 15, wherein the aqueous composition further comprises at least one of a filler; a defoaming agent; a rheological modifier; or a biocide.

17. The method of claim 15, wherein the sound absorption material is a foam, a polyethylene terephthalate fiber, a cotton shoddy, a synthetic shoddy, wood, drywall, or felt.

18. The method of claim 15, wherein the applying comprises spray-applying the aqueous composition to the sound absorption material.

19. The method of claim 18, wherein the composition is spray-applied at a distance of from about 6 inches to about 30 inches away from the surface of the fiber or foam material.

20. The method of claim 18, wherein the aqueous composition is applied at 100 g/m$^2$ to about 1000 g/m$^2$ on the sound absorption material.

* * * * *